(12) United States Patent
Breton et al.

(10) Patent No.: US 8,088,188 B2
(45) Date of Patent: Jan. 3, 2012

(54) GASIFICATION SYSTEM AND PROCESS WITH STAGED SLURRY ADDITION

(75) Inventors: David L. Breton, Houston, TX (US); Albert C. Tsang, Sugar Land, TX (US); Max W. Thompson, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/078,461

(22) Filed: Apr. 1, 2011

(65) Prior Publication Data

US 2011/0182778 A1    Jul. 28, 2011

Related U.S. Application Data

(63) Continuation of application No. 12/640,226, filed on Dec. 17, 2009, now Pat. No. 7,959,829.

(51) Int. Cl.
*C10J 3/00* (2006.01)
(52) U.S. Cl. ............ 48/203; 48/76; 48/127.9; 48/127.1; 48/61; 48/197 R; 48/202; 48/206; 48/209; 48/210; 422/187; 422/188; 110/235

(58) Field of Classification Search ................ 48/127.9, 48/127.1, 61, 197 R, 206, 76, 111, 62 R, 48/202, 210
See application file for complete search history.

(56) References Cited

U.S. PATENT DOCUMENTS 3,715,301 A * 2/1973 Tassoney et al. ............. 208/408
5,560,900 A * 10/1996 Gbordzoe et al. ............ 423/650

* cited by examiner

*Primary Examiner* — Kaity V. Handal

(57) ABSTRACT

A system and process for gasifying carbonaceous feedstock with staged slurry addition in order to prevent the formation of tar that causes deposition problems. Dry solid carbonaceous material is partially combusted, then pyrolyzed along with a first slurry stream comprising carbonaceous material in two separate reactor sections, thereby producing mixture products comprising synthesis gas. The second slurry stream comprising particulate carbonaceous material is fed to a drying unit downstream of a heat recovery zone along with the mixture product exiting the heat recovery zone The resulting final temperature of the second stage mixture products and dried particulate carbonaceous material is between 450° F. and 550° F., a temperature range that is typically not conducive to the emission of heavy molecular-weight tar species.

20 Claims, 2 Drawing Sheets

GASIFICATION SYSTEM AND PROCESS WITH STAGED SLURRY ADDITION

CROSS-REFERENCE TO RELATED APPLICATIONS

This application is a continuation application that claims benefit under 35 USC §120 to U.S. application Ser. No. 12/640,226, (now U.S. Pat. Ser. No. 7,959,829), filed 17 Dec. 2009, entitled "GASIFICATION SYSTEM AND PROCESS WITH STAGED SLURRY ADDITION", which claims benefit under 35 USC §119(e) to U.S. Provisional Application Ser. No. 61/138,312, filed 17 Dec. 2008, entitled "GASIFICATION SYSTEM AND PROCESS WITH STAGED SLURRY ADDITION". Both of these applications are incorporated herein in their entirety.

BACKGROUND OF THE INVENTION

The present invention relates generally to a gasification system and process for converting generally solid feedstock such as carbonaceous material into desirable gaseous products such as synthesis gas. Gasification system and process must be designed to be simple yet to deliver the maximum conversion efficiency.

Three basic types of system and processes have been developed for the gasification of carbonaceous materials. They are: (1) fixed-bed gasification, (2) fluidized-bed gasification, and (3) suspension or entrainment gasification. The present invention relates to the third type of system and process—suspension or entrainment gasification. More particularly, the present invention relates to a two stage entrained gasification system and process for gasifying carbonaceous materials.

The flexibility of the two stage design can be exploited by maximizing the slurry feed rate to the lower temperature second stage gasifier, thereby utilizing the heat generated form the first stage gasifier to evaporate the water from the slurry. The char and unconverted carbon exiting the second stage gasifier are then separated and recycled back to the first stage gasifier, in a dry form, thus minimizing the amount of oxygen required in the higher temperature first stage and maximizing the conversion efficiency of the gasifier.

One problem with feeding to the lower temperature second stage is that the tar produced during the pyrolysis of the coal or petroleum coke would not be adequately destroyed. The undestroyed tar would condense when the syngas is cooled, thereby fouling the heat exchange surfaces or plugging up the filters downstream.

SUMMARY OF THE INVENTION

This invention discloses a system and process for gasifying feedstock such as carbonaceous materials with staged slurry addition by which to prevent the formation of tar that causes deposition problems. The invention includes partial combustion of dry solids comprising carbonaceous material and pyrolysis of the first slurry stream comprising carbonaceous material in two separate reactor sections and produce mixture products comprising synthesis gas. The second slurry stream comprising particulate carbonaceous material is fed to a drying unit downstream of the heat recovery zone along with the mixture product exiting the heat recovery zone The temperature of the syngas exiting the heat recovery zone is adjusted so that the final temperature of the syngas after the slurry is dried will be in a temperature range where heavy molecular-weight tar species are typically not emitted. The char particles formed in the process are separated from the syngas by a cyclone, and optionally by a particulate filtering device, collected, then recycled to the first stage gasifer which is operated at slagging conditions. The syngas exiting the cyclone and filter will be both tar and particulate-free.

Certain embodiments of the present invention relate to a process for gasifying a carbonaceous material comprising the steps of: a) introducing a dry feedstock comprising recycled char and a solid stream comprising particulate carbonaceous material into a reactor lower section and partially combusting therein with a gas stream comprising an oxygen supply selected from a group consisting of oxygen-containing gas, steam, and mixture thereof thereby evolving heat and forming products comprising synthesis gas and molten slag; b) passing the synthesis gas from the reactor lower section upward into a reactor upper section and pyrolysing therein with a first slurry stream comprising a slurry of particulate carbonaceous material in a liquid carrier thereby forming mixture products comprising a gaseous product stream comprising synthesis gas and char; c) passing the mixture products in step b through a heat recovery zone; d) introducing a second slurry stream comprising particulate carbonaceous material in a liquid carrier and the mixture products exiting from the heat recovery zone into a drying unit wherein the water in the second slurry stream is vaporized and the solid stream comprising particulate carbonaceous material is formed; e) passing said mixture products and the solid stream in step d through a separating device whereby said char and the solid stream are separated from said gaseous product stream; optionally f) passing the gaseous product stream in step (e) through a particulate filtering device whereby residual solid fines and particulates are separated from the gaseous product stream; and g) recycling the dry stock comprising the char and the dried particulate carbonaceous material from step e and residual solid fines and particulates from step f back to the reactor lower section. During such process, the heat evolved in said step (a) is recovered by converting the first slurry stream comprising particulate carbonaceous material and the carrier liquid in step (b) into the gaseous product stream in step (b).

This process may further comprise a step of introducing the mixture products of the second stage reaction into a tar removal residence vessel before entering the heat recovery zone.

Certain other embodiments of the present invention relate to a system for gasifying a carbonaceous material comprising: a) reactor lower section for partially combusting a solid stream comprising particulate carbonaceous material with a gas stream comprising an oxygen supply selected from a group consisting of oxygen-containing gas, steam, and mixture thereof to produce heat and mixture products comprising synthesis gas and molten slag, wherein the reactor lower section comprising one or more dispersion devices for introducing the gas stream and the dry feedstock; b) a reactor upper section for pyrolysing the synthesis gas from the reactor lower section with a first slurry stream comprising particulate carbonaceous material in a liquid carrier to produce mixture products comprising a gaseous product stream comprising synthesis gas and char; c) a heat recovery zone for cooling the mixture products; d) a drying unit for a second slurry stream comprising particulate carbonaceous material in a liquid carrier to contact the mixture product exiting the heat recovery zone thereby vaporizing the water in the second slurry stream and forming a solid stream comprising particulate carbonaceous material; e) a separating device for separating the char and the solid stream from the gaseous product stream in the mixture products; and f) particulate filtering device for separating residual solid fines and particulates from the gaseous product stream. With such system, the heat produced from the reactor lower section is recovered by converting the first slurry stream comprising particulate carbonaceous material in the carrier liquid in the reactor upper section into the gaseous product stream in the reactor upper section. Such system may further comprise a tar removal residence vessel upstream of the heat recovery zone.

The reactor lower section further comprises one or more dispersion devices for introducing the stream comprising oxygen supply gas such as oxygen-containing gas and steam and the recycled char into the reactor lower section. The reactor upper section further comprises one or more feeding devices for feeding the slurry of particulate carbonaceous material in the liquid carrier into the reactor upper section. The reactor upper section may be, but not limited to be, positioned above the reactor lower section. The heat recovery zone may comprise a heat recovery device selected from radiant heat type boiler, water tube boiler, fire tube boiler and combination thereof. The drying unit comprises one or more dispersion devices.

The temperature of the reactor lower section is maintained from 1500° F. to 3500° F. The pressure in the reactor lower section and reactor upper section are from about 14.7 psig to about 2000 psig. The velocity of gases and char passing through the dispersion devices of the reactor lower section is from 20 to 120 feet per second. The residence time of char in the reactor lower section is from 2 to 10 seconds. The velocity of the slurry stream passing through the feeding devices of the reactor upper section is from 10 to 80 feet per second. The residence time of the slurry of the particulate carbonaceous material in the reactor upper section is from 5 to 40 seconds. The temperature of the second stage mixture products and dried particulate carbonaceous material, after the second slurry stream is added and prior to the separation device, is between 300° F. and 900° F., preferably between 400° F. and 700° F., and most preferably between 450° F. and 550° F.

The percentage amount of first slurry stream to be introduced into the reactor upper section is between 0% and 50%, preferably between 10% and 40%, and most preferably between 25% and 35%, wherein the percentage amount of a second slurry stream to be introduced into the drying unit downstream of the heat recovery process is between 50% and 100%, preferably between 60% and 90%, and most preferably between 65% and 80%.

BRIEF DESCRIPTION OF THE DRAWINGS

For a more detailed description of the embodiments of the present invention, reference will now be made to the accompanying drawings, wherein.

DETAILED DESCRIPTION OF THE PREFERRED EMBODIMENT

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
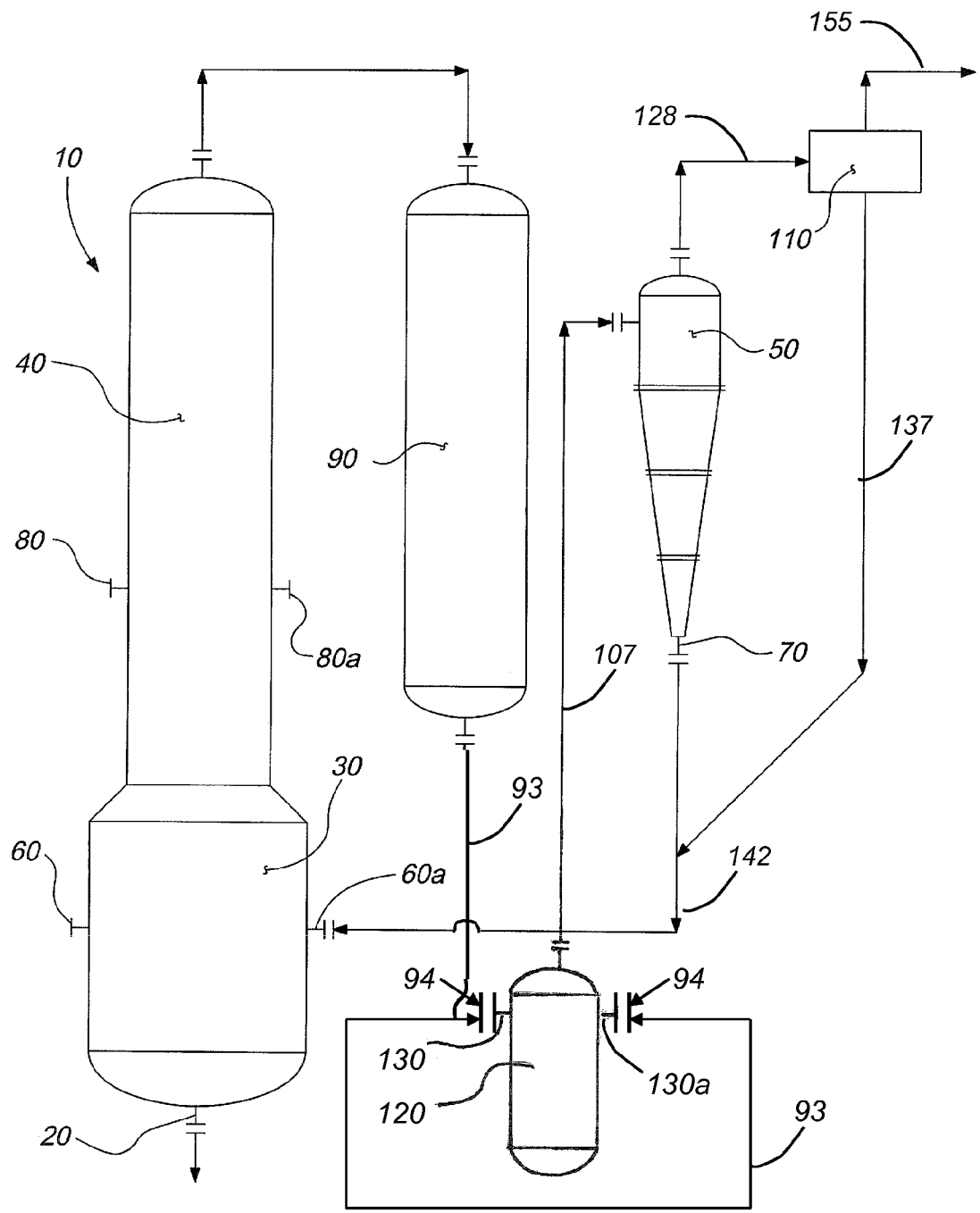
FIG. 1 is a schematic representation of a system useful in and a pictorial process flow diagram for an embodiment in connection with the present invention.
Figure 2:
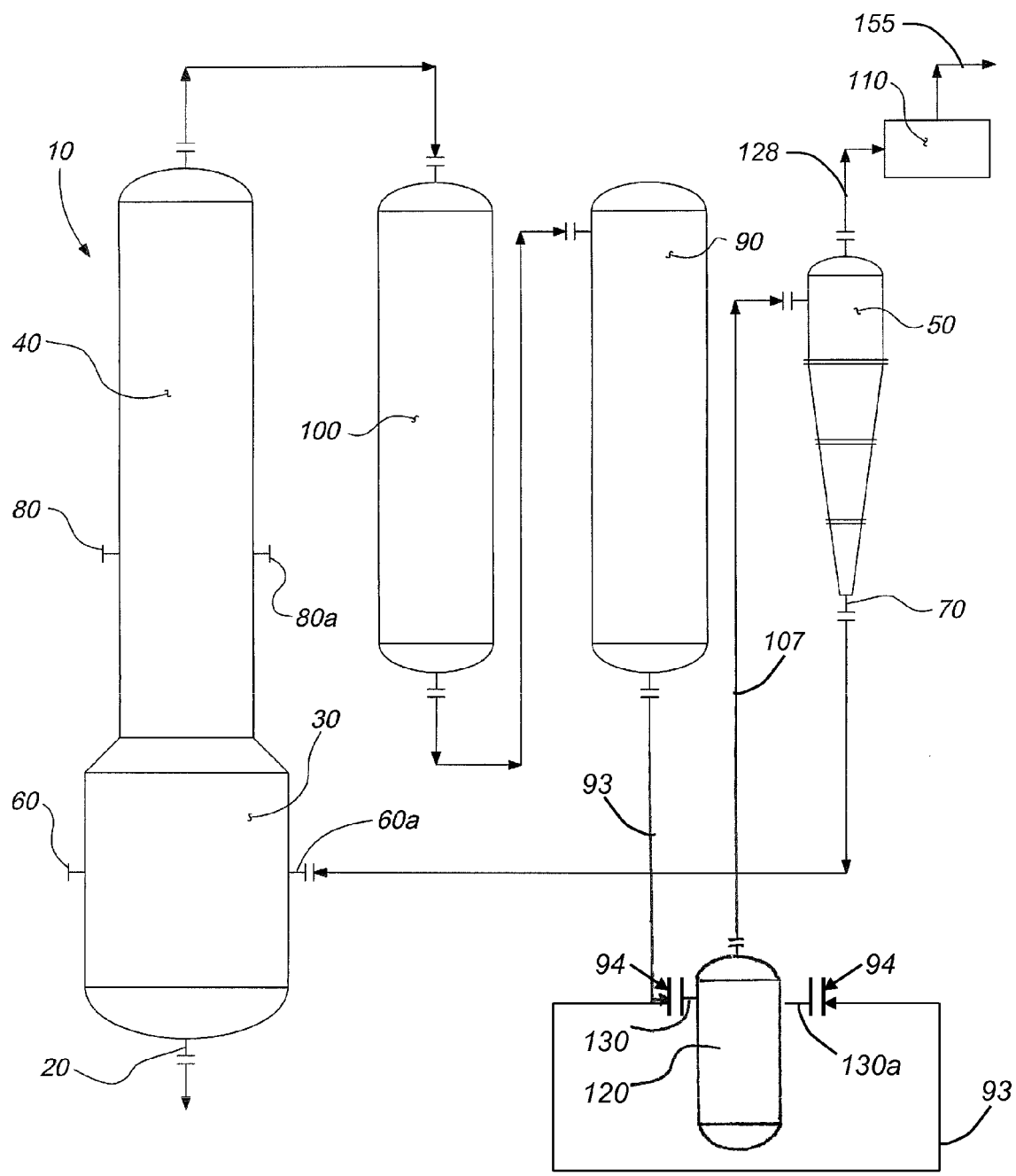
FIG. 2 is a schematic representation of a system useful in and a pictorial process flow diagram for an alternative embodiment in connection with the present invention.

Referring to FIGS. 1-2, various embodiments of the present invention provide a gasification reactor, indicated generally by reference numeral 10, that comprises a reactor lower section 30 and a reactor upper section 40. The reactor lower section 30 defines the first stage reaction zone and will also be referred to as the first stage reaction zone. The reactor upper section 40 defines the second stage reaction zone, and will also be referred to as the second stage reaction zone.

Further refer to FIGS. 1-2, the recycled char, and a stream comprising an oxygen supply such as oxygen-containing gas and/or steam at high pressure is entered into the gasification reactor 10 lower section 30 through dispersion device 60 and/or 60a, which located, for example, oppositely of the reactor lower section 30. More than two dispersion devices can be used, for example, four, arranged 90 degrees apart. The sets of dispersion devices can also be on different levels and do not need to be on the same plane. Within the reactor lower section 30, also the first stage reaction zone, the recycled char and a oxygen-containing gas stream (that may comprise steam) react in such fashion that rapid mixing and reaction of the reactants occurs and a rotating motion is imparted to the reactants, which then pass upwardly through the lower section 30 of the reactor 10. The reaction in the reactor lower section 30 is the first stage of the gasification process, wherein the recycled char and a oxygen-containing gas stream (that may comprise steam) are converted exothermically into mixture products comprising steam, synthesis gas, intermediate gases, and entrained by-products such as molten slag. The molten slag is drained from the bottom of the reactor 10 through a tap hole 20, to a slag processing system (not shown) for final disposal.

The steam, intermediate, and synthesis gas then exit from reactor lower section 30 by flowing upward into an unfired reactor upper section 40 where a first slurry stream comprising particulate carbonaceous material in liquid carrier are injected through feeding device 80 and/or 80a, or additional feeding devices. The heat produced in the reactor lower section 30 is carried upward with the gas stream and drives the pyrolysis process that takes place in the unfired reactor upper section 40, including vaporization of the feed water, the carbon-steam reaction and the water-gas reaction between CO and $H_2O$. The carbon-steam reaction forms CO and $H_2$, thereby increasing the yield of these usable gases. While the fired reactor lower section 30 (or the first stage reaction zone of the reactor 10) is primarily a combustion reactor, the reactor upper section 40 is primarily a quench reactor which also increases the heating value of the gases. The reactions occurring in unfired reactor upper section 40 thus enrich the gases emanating from the fired partial combustion reactor lower section 30 to produce a higher grade of synthesis gas, and in doing so, recover heat from the reactor lower section 30 and cool the gases sufficiently such that that the slag entrained during the process is cooled below the ash fusion initial deformation temperature. By cooling to below the ash initial deformation temperature, the entrained slag droplets agglomerate either to themselves or to entrained particulate carbonaceous material prior to reaching the heat transfer surfaces, and therefore do not adhere to the heat transfer surfaces. The reaction conditions in the reactor upper section 40 will be disclosed in more detail later.

In the embodiments of the present invention depicted in FIG. 1-2, the unfired reactor upper section 40 of the reactor 10 is connected directly to the top of the fired reactor lower section 30 of the reactor 10, such that hot reaction products are conveyed directly from the reactor lower section 30 to the reactor upper section 40 to minimize heat losses in the gaseous reaction products and entrained solids.

As illustrated in FIG. 1-2, the char produced by gasification reaction may be removed and recycled to increase carbon conversion. For example, char may be recycled through dispersion devices 60 and/or 60a (or others) into the reactor lower section, or the first reaction zone as discussed above.

The dispersion devices 60 and/or 60a provide an atomized feed of the particulate solids such as char. The dispersion devices may be of the type having a central tube for the solids and an annular space surrounding the central tube containing the atomizing gas which opens to a common mixing zone either internally, or externally. Further, the feeding devices 80 and/or 80a of the unfired reactor upper section 40 may also be similar to the dispersion devices described herein, or simply comprise a tube for slurry feeding. The dispersion devices 60 and/or 60a, or feeding devices 80 and/or 80a can be designed as commonly known to those skilled in the art.

As further shown in FIG. 1, the mixture products of the second stage reaction occurring in the reactor upper section 40 emanate from the top of the upper section 40 and are introduced into a heat recovery zone 90, whereby the temperature of the mixture products is lowered.

In certain embodiments, the heat recovery zone 90 comprises a radiant heat-type boiler or water tube boiler or a fire tube boiler. In certain other embodiments, the heat recovery zone 90 comprises a cold recycle syngas as quenching gas.

In the embodiments depicted in FIG. 1-2, the mixture products 93 of the second stage reaction 40 exiting the heat recovery zone 90, and a second slurry stream comprising particulate carbonaceous material in liquid carrier 94, are introduced into a drying unit 120 through feeding device 130 and/or 130a, wherein the water in the second slurry stream is vaporized. Through such a process, a solid stream comprising particulate carbonaceous material is formed.

As illustrated further in FIGS. 1-2, the combined stream 107 of the second stage mixture products and the solid stream comprising particulate carbonaceous material, both exit from drying unit 120, and are further introduced into a separating device 50 that splits the combined stream into a solids stream and gaseous product stream 128, leaving only a small fraction of residual solid fines in the gas stream.

The gaseous product stream 128 exiting from separating device 50 comprises hydrogen, carbon monoxide, a small amount of methane, hydrogen sulfide, ammonia, nitrogen, carbon dioxide and small fraction of residual solid fines. The gaseous product stream 128 may be further introduced into a particulate filtering device 110 whereby the residual solid fines and particulates are removed.

The solids stream 70 exiting separating device 50 comprises solidified ash and char formed in the unfired reactor upper section reactor 40, along with dried particulate carbonaceous material.

The solids stream 70 exiting from separating device 50 and residual solid fines 137 exiting from filtering device 110 are mixed with oxygen-containing gas and/or steam and recycled 142 back to the fired reactor lower section 30 through dispersion devices 60 and/or 60a as feed stock for the first stage reaction.

The solids stream 70 is then gasified under slagging conditions by reaction with oxygen and steam, producing mixture products including synthesis gas and heat required for the second stage reaction within the upper reactor section 40.

In another embodiment as illustrated in FIG. 2, the mixture products of the second stage reaction are withdrawn from the top of the upper section 40 of the reactor 10 and introduced into a tar removal vessel such as, but not limited to, a residence vessel 100 before entering the heat recovery zone 90. The primary function of the residence vessel is to destroy any tar component present in the mixture products.

The materials of construction of the gasification reactor 10 are not critical. Preferably, but not necessarily, the reactor walls are steel and are lined with an insulating castable, ceramic fiber or refractory brick, such as a high chromium-containing brick in the reactor lower section 30. Meanwhile, a readily-available dense medium is utilized to line the reactor upper section, such as is used in blast furnaces and non-slagging applications to 1) reduce heat loss, 2) protect the vessel from high temperature and corrosive molten slag, as well as to 3) provide for better temperature control. Use of this type of system provides the high recovery of heat values from the carbonaceous solids used in the process. Optionally and alternatively, the walls may be unlined by providing a "cold wall" system for fired reactor lower section 30 and, optionally, unfired upper section 40. The term "cold wall", as used herein, means that the walls are cooled by a cooling jacket with a cooling medium, as is known conventionally in the art for coal gasification systems. In such a system, the slag freezes on the cooled interior wall and protects the metal walls of the cooling jacket.

The physical conditions of the reaction in the first stage of the process in the reactor lower section 30 are controlled and maintained to assure rapid gasification of the char at temperatures exceeding the melting point of ash produced by char gasification to produce a molten slag from the melted ash having a slag viscosity not greater than approximately 250 poises. The physical conditions of the reaction that occurs in the second stage/upper section 40 are controlled to assure rapid gasification and heating of the coal above its range of plasticity. The temperature of fired reactor lower section 30 is maintained from 1500° F. to 3500° F., preferably from 2000° F. to 3200° F., and most preferably from 2400° F. to 3000° F. At such temperatures in the first stage in the reactor lower section 30, ash formed by the gasification of char therein melts to form molten slag which drains through the tap hole and is further processed in units outside the scope of this document. The gas mixture from the first stage leaves in the rotating upwardly moving vortex of gases and char that ascends through the reactor lower section. The temperature of unfired reactor upper section reactor 40 is maintained from 1200° F. to 2200° F., preferably from 1500° F. to 2000° F. and most preferably from 1700° F. to 1900° F. The hot intermediate product flowing upward from fired reactor lower section 30 provides heat for the endothermic reactions that occur in the unfired upper reactor section 40.

The temperature of the mixture products of the second stage is typically from about 1700° F. to about 1900° F. prior to entering the heat recovery zone 90. The operation parameters of the heat recovering zone are to be adjusted according to the type of the particulate carbonaceous and the concentration of the particulate carbonaceous material in the liquid carrier. More specifically, the temperature in which the heat recovering process were operated under should be adjusted and controlled to allow the final temperature of the combined stream 107 of second stage mixture products and the solid stream comprising particulate carbonaceous material, both exiting from drying unit 120 to be between 300 and 900° F., preferably between 400 and 700° F., and most preferably around 500° F. At such temperatures, heavy molecular-weight tar species are typically not emitted. Consequently, the syngas 155 exiting the particulate filtering device 110 will be tar free and particulate-free, and can be easily processed further by conventional purification processes including acid gas removal and sulfur recovery, etc.

The process of this invention is carried out at atmospheric or higher pressures. Generally, the pressure in reactor lower section 30 and reactor upper section 40 is from about 14.7 psig to about 2000 psig, preferably from 50 psig to 1500 psig and, most preferably, from 150 psig to 1200 psig. The pressure in heat recovery zone 90 is from about 14.7 psig to about 1500 psig, preferably from 50 psig to 1500 psig and most preferably from 150 psig to 1200 psig. In another embodiment as shown in FIG. 2, the pressure in the residence vessel 100 for tar removal is from about 14.7 psig to about 1500 psig, preferably from 50 psig to 1500 psig and most preferably from 150 psig to 1200 psig.

In the various embodiments of the present invention, the velocity or the feed rate of gases and solids passing through the dispersion devices 60 and/or 60a, of the reactor lower section reactor 30 is kept between 20 and 120 feet per second, and preferably between 20 and 90 feet per second, and most preferably between 30 and 60 feet per second. The residence time of char in the reactor lower section 30 is kept between 2 seconds and 10 seconds and preferably between 4 seconds and 6 seconds. The velocity or the feed rate of the slurry stream passing through the feeding device 80 and/or 80a of the reactor upper section reactor 40 is kept between about 5 feet per second and 100 feet per second, preferably between about 10 feet per second and 80 feet per second, and most preferably between about 20 feet per second and 60 feet per second. The residence time in the reactor upper section 40 is maintained between about 5 seconds and 40 seconds.

In the various embodiments of the present invention, for a given gasification process, the amount of the first slurry stream comprising particulate carbonaceous material in liquid carrier to be injected into the unfired reactor upper section 40 through feeding device 80 and/or 80a is between 0% and 50% of the total amount, preferably between 10% and 40% of the total amount, and most preferably between 20% to 35% of the total amount.

Accordingly, the amount of the second liquid stream comprising slurry of particulate carbonaceous solid and liquid carrier to be introduced to drying unit 120 is between 50% and 100% of the total amount, preferably between 6%0 and 90% of the total amount, and most preferably between 65% and 80% of the total amount.

The process is applicable to any particulate carbonaceous material. Preferably, however, the particulate carbonaceous material is coal which, without limitation, includes lignite, bituminous coal, sub-bituminous coal, or any combination thereof. Additional carbonaceous materials are coke from coal, coal char, coal liquefaction residues, particulate carbon, petroleum coke, carbonaceous solids derived from oil shale, tar sands, pitch, biomass, concentrated sewer sludge, bits of garbage, rubber and mixtures thereof. The foregoing exemplified materials can be in the form of comminuted solids, and for best materials handling and reaction characteristics, as pumpable slurries in a liquid carrier.

The liquid carrier for carbonaceous solid materials can be any liquid which is capable of vaporizing and participating in the reactions to form desired gaseous products, particularly carbon monoxide and hydrogen. The most readily considered liquid carrier is water which forms steam in lower reactor section 30. The steam is capable of reacting with carbon to form gaseous products which are constituents of synthesis gas. In addition, liquids other than water may be used to slurry the carbonaceous material. Preferably, the liquid is water, but it may also be a hydrocarbon such as, for example, fuel oil, residual oil, petroleum, and liquid $CO_2$. When the liquid carrier is a hydrocarbon, additional water or steam may be added to provide sufficient water for efficient reaction and for moderating the reactor temperature.

Any gas containing at least 20 percent oxygen may be used as the oxygen-containing gas fed to fired reactor lower section 30. Preferred oxygen-containing gases include oxygen, air, and oxygen-enriched air.

The concentration of particulate carbonaceous material in the carrier liquid as a slurry is only that necessary to have a pumpable mixture. In general, the concentration ranges up to 80% by weight of the solid material. Preferably, the concentration of particulate carbonaceous material in the slurry ranges from 30% to 75% by weight in both the first and second stages of the process. More preferably, the concentration of coal in aqueous slurry is between 45% and 70% by weight.

When coal is the feedstock, it can be pulverized before being blended with a liquid carrier to form slurry, or ground together with the liquid media. In general, any reasonably finely-divided carbonaceous material may be used, and any of the known methods of reducing the particle size of particulate solids may be employed. Examples of such methods include the use of ball, rod and hammer mills. While particle size is not critical, finely divided carbon particles are preferred. Powdered coal used as fuel in coal-fed power plants is typical. Such coal has a particle size distribution in which 90 percent by weight of the coal passes through a 200 mesh sieve. A coarser size of 100 mesh average particle size can also be used for more reactive materials, provided stable and non-settling slurry can be prepared.

As used herein, the term "char" refers to unburned carbon and ash particles that remain entrained within a gasification system after production of the various products.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention.

Any element in a claim that does not explicitly state "means for" performing a specified function, or "step for" performing a specific function, is not to be interpreted as a "means" or "step" clause as specified 35 U.S.C. §112 ¶ 6. In particular, the use of "step of" in the claims herein is not intended to invoke the provisions of 35 U.S.C. §112 ¶6.

What is claimed is:

1. A system for gasification, comprising:
  a. a reactor lower section adapted for partially combusting a carbonaceous feedstock with a gas stream comprising an oxygen supply to produce heat and mixture products comprising synthesis gas and molten slag,
  b. a reactor upper section adapted for pyrolyzing the synthesis gas from the reactor lower section with a first slurry stream comprising particulate carbonaceous material in a liquid carrier to produce mixture products comprising a gaseous product stream,
    wherein the gaseous product stream comprises synthesis gas and char, c. a heat recovery zone adapted for cooling the mixture products exiting the reactor upper section;

d. a drying unit adapted for drying the mixture products exiting the heat recovery zone and a second slurry stream comprising particulate carbonaceous material in a liquid carrier, thereby vaporizing the liquid in the second slurry stream and forming a solid stream comprising particulate carbonaceous material;

e. a separating device adapted for separating said char and the solid stream from the gaseous product stream in said mixture products;

f. a particulate filtering device adapted for separating residual solid fines and particulates from said gaseous product stream.

2. The system of claim 1, further comprising a tar removal residence vessel upstream of said heat recovery zone.

3. The system of claim 1, wherein the reactor lower section further comprises one or more dispersion devices adapted for introducing the solid stream of part (e) into the reactor lower section.

4. The system of claim 1, wherein the drying unit further comprises one or more dispersion devices for introducing the second slurry stream into the drying unit.

5. The system of claim 1, wherein the reactor lower section is adapted for partially combusting a feedstock comprising char and a solid stream that have been recycled from the separating device and the particulate filtering device.

6. The system of claim 1, wherein the separating device is adapted for recycling the separated char and the solid stream of part (e) to the reactor lower section.

7. The system of claim 1, wherein the particulate filtering device is adapted for recycling the residual solid fines and particulates of part (f) to the reactor lower section.

8. A system for gasification, comprising:

a. a reactor lower section adapted for partially combusting a carbonaceous feedstock with a gas stream comprising an oxygen supply selected from a group consisting of oxygen-containing gas, steam, and mixtures thereof, thereby evolving heat and forming mixture products comprising synthesis gas and molten slag;

b. a reactor upper section adapted for pyrolyzing the synthesis gas from the reactor lower section with a first slurry stream comprising particulate carbonaceous material in a liquid carrier to produce mixture products comprising a gaseous product stream,
wherein the gaseous product stream comprises synthesis gas and char,
wherein the reactor upper section is adapted for recovering at least a portion of the heat produced in the reactor lower section by converting the first slurry stream into said mixture products;

c. a heat recovery zone adapted for cooling said mixture products exiting the reactor upper section;

d. a drying unit adapted for creating a combined stream comprising the mixture products exiting the heat recovery zone and a second slurry stream comprising particulate carbonaceous material in a liquid carrier,
wherein the drying unit is adapted for drying the combined stream, thereby vaporizing the liquid in said second slurry stream and forming a solid stream comprising particulate carbonaceous material,
wherein the drying unit further comprises one or more dispersion devices for introducing the second slurry stream into the drying unit;

e. a separating device downstream from the drying unit adapted for receiving the combined stream and splitting said stream into a solid stream and a gas stream, leaving only a small fraction of residual solid fines in the gas stream,
wherein the solid stream comprises particulate carbonaceous material;

f. a particulate filtering device for separating residual solid fines and particulates from said gas stream.

9. The system of claim 8, further comprising a tar removal vessel for removing tar from the mixture products of step (b), wherein the tar removal vessel is downstream of the reactor upper section and upstream from the heat recovery zone.

10. The system of claim 8, wherein the reactor lower section further comprises one or more dispersion devices adapted for introducing the solid stream of part (e) into the reactor lower section.

11. The system of claim 8, wherein the reactor lower section is adapted for partially combusting a dry feedstock that has been recycled from the separating device and the particulate filtering device.

12. The system of claim 8, wherein the reactor upper section further comprises one or more feeding devices adapted for feeding the slurry of particulate carbonaceous material in a liquid carrier into the reactor upper section.

13. The system of claim 8, wherein the reactor lower section is adapted for partially combusting a feedstock comprising char and a solid stream that have been recycled from the separating device and the particulate filtering device.

14. The system of claim 8, wherein the separating device is adapted for recycling the separated char and the solid stream of part (e) to the reactor lower section.

15. The system of claim 8, wherein the particulate filtering device is adapted for recycling the residual solid fines and particulates of part (f) to the reactor lower section.

16. A system for gasification of a carbonaceous material, comprising:

a. reactor lower section adapted for partially combusting a dry feedstock with a gas stream comprising an oxygen supply selected from a group consisting of oxygen-containing gas, steam, and mixtures thereof to produce heat and mixture products comprising synthesis gas and molten slag,
wherein the reactor lower section comprises one or more dispersion devices adapted for introducing the gas stream and the solid stream,
wherein the dry feedstock comprising recycled char and a solid stream comprising particulate carbonaceous material;

b. a reactor upper section adapted for pyrolyzing said synthesis gas from said reactor lower section with a first slurry stream comprising particulate carbonaceous material in a liquid carrier to produce mixture products comprising a gaseous product stream,
wherein the gaseous product stream comprises synthesis gas and char,
wherein the reactor upper section further comprises one or more feeding devices adapted for feeding the slurry of particulate carbonaceous material in a liquid carrier into the reactor upper section,
wherein the reactor upper section is adapted for recovering at least a portion of the heat produced in the reactor lower section by converting the first slurry stream into said mixture products;

c. a heat recovery zone adapted for cooling the mixture products exiting the reactor upper section;

d. a drying unit adapted for creating a combined stream comprising the mixture products exiting the heat recovery zone and a second slurry stream comprising particulate carbonaceous material in a liquid carrier,
wherein the drying unit is adapted for drying the combined stream, thereby vaporizing the liquid in said second slurry stream and forming a solid stream comprising particulate carbonaceous material,
wherein the drying unit further comprises one or more dispersion devices for introducing the second slurry stream into the drying unit;
e. a separating device downstream from the drying unit adapted for receiving the combined stream and splitting said stream into a solid stream and a gas stream, leaving only a small fraction of residual solid fines in the gas stream,
wherein the solid stream comprises particulate carbonaceous material;
f. a particulate filtering device for separating residual solid fines and particulates from said gas stream.

17. The system of claim 16, further comprising a tar removal vessel for removing tar from the mixture products of step (b), wherein the tar removal vessel is downstream of the reactor upper section, and upstream from the heat recovery zone.

18. The system of claim 16, wherein the reactor lower section is adapted for partially combusting a dry feedstock that has been recycled from the separating device and the particulate filtering device.

19. The system of claim 16, wherein the separating device is adapted for recycling the separated char and the solid stream of part (e) to the reactor lower section.

20. The system of claim 16, wherein the particulate filtering device is adapted for recycling the residual solid fines and particulates of part (f) to the reactor lower section.

* * * * *